US009022733B2

(12) United States Patent
Coupe et al.

(10) Patent No.: US 9,022,733 B2
(45) Date of Patent: May 5, 2015

(54) TURBINE DISTRIBUTOR ELEMENT MADE OF CMC, METHOD FOR MAKING SAME, DISTRIBUTOR AND GAS TURBINE INCLUDING SAME

(75) Inventors: Dominique Coupe, Le Haillan (FR); Guillaume Jean-Claude Robert Renon, Vaux le Penil (FR)

(73) Assignees: SNECMA, Paris (FR); SNECMA Propulsion Solide, Le Haillan (FR)

( * ) Notice: Subject to any disclaimer, the term of this patent is extended or adjusted under 35 U.S.C. 154(b) by 636 days.

(21) Appl. No.: 13/379,149

(22) PCT Filed: Jun. 9, 2010

(86) PCT No.: PCT/FR2010/051149
§ 371 (c)(1),
(2), (4) Date: Dec. 19, 2011

(87) PCT Pub. No.: WO2010/146288
PCT Pub. Date: Oct. 23, 2010

(65) Prior Publication Data
US 2012/0099982 A1    Apr. 26, 2012

(30) Foreign Application Priority Data

Jun. 18, 2009    (FR) .................................... 09 54101

(51) Int. Cl.
*F01D 9/04*    (2006.01)
*F01D 5/28*    (2006.01)
(Continued)

(52) U.S. Cl.
CPC ................ *F01D 9/04* (2013.01); *C04B 35/524* (2013.01); *C04B 35/5603* (2013.01);
(Continued)

(58) Field of Classification Search
CPC .......... F05D 2300/00; F05D 2300/601; F05D 2300/602; F05D 2300/6023; F01D 9/04; F01D 9/041; F01D 9/042; F01D 5/284
USPC ............. 415/200, 208.1, 208.2, 209.2, 209.3, 415/209.4, 210.1; 416/230, 241 B, 189, 190, 416/191, 192, 193 R, 193 A; 29/889.22, 29/890.142, 419.1
See application file for complete search history.

(56) References Cited

U.S. PATENT DOCUMENTS 3,632,460 A    1/1972    Palfreyman et al.
4,958,663 A *  9/1990    Miller et al. ............... 139/384 R
(Continued)

FOREIGN PATENT DOCUMENTS

EP    0 466 602    1/1992
EP    1 674 599    6/2006
(Continued)

OTHER PUBLICATIONS

Nakamura JP2003148105 English Machine Translation, Translated by ProQuest Jul. 29, 2014.*
(Continued)

*Primary Examiner* — Nathaniel Wiehe
*Assistant Examiner* — Wayne A Lambert
(74) *Attorney, Agent, or Firm* — Oblon, McClelland, Maier & Neustadt, L.L.P.

(57) ABSTRACT

A turbine nozzle element including an inner annular platform sector, an outer annular platform sector, and at least one vane extending between the platform sectors and connected to both of them. The nozzle element includes a single piece of composite material including fiber reinforcement densified by a matrix that is at least partially ceramic, and the fiber reinforcement includes a fiber structure that is woven by three-dimensional or multi-layer weaving, and that presents continuity throughout the volume of the nozzle element and throughout the periphery of the vane.

17 Claims, 12 Drawing Sheets

(51) Int. Cl.
*C04B 35/524* (2006.01)
*C04B 35/56* (2006.01)
*C04B 35/571* (2006.01)
*C04B 35/589* (2006.01)
*C04B 35/628* (2006.01)
*C04B 35/80* (2006.01)

(52) U.S. Cl.
CPC ............ *C04B 35/571* (2013.01); *C04B 35/589* (2013.01); *C04B 35/62857* (2013.01); *C04B 35/62868* (2013.01); *C04B 35/62873* (2013.01); *C04B 35/62884* (2013.01); *C04B 35/62894* (2013.01); *C04B 35/62897* (2013.01); *C04B 35/806* (2013.01); *C04B 2235/5244* (2013.01); *C04B 2235/5248* (2013.01); *C04B 2235/612* (2013.01); *C04B 2235/614* (2013.01); *C04B 2235/616* (2013.01); *C04B 2235/95* (2013.01); *F01D 5/284* (2013.01); *Y02T 50/67* (2013.01); *Y02T 50/672* (2013.01); *F05D 2230/313* (2013.01); *F05D 2300/601* (2013.01); *F05D 2300/6012* (2013.01)

(56) References Cited

U.S. PATENT DOCUMENTS

| 5,131,808 | A | 7/1992 | Ciais et al. | |
| 6,196,794 | B1* | 3/2001 | Matsumoto | 415/191 |
| 2002/0056484 | A1* | 5/2002 | Uchida et al. | 139/383 R |
| 2006/0130957 | A1 | 6/2006 | Kostar et al. | |
| 2007/0175535 | A1 | 8/2007 | Kostar et al. | |
| 2009/0311462 | A1* | 12/2009 | Goering | 428/99 |

FOREIGN PATENT DOCUMENTS

| FR | 2 625 528 | 7/1989 |
| JP | 2003 148105 | 5/2003 |
| WO | 91 15357 | 10/1991 |

OTHER PUBLICATIONS

International Search Report Issued Nov. 5, 2010 in PCT/FR101/051149 Filed Jun. 9, 2010.

* cited by examiner

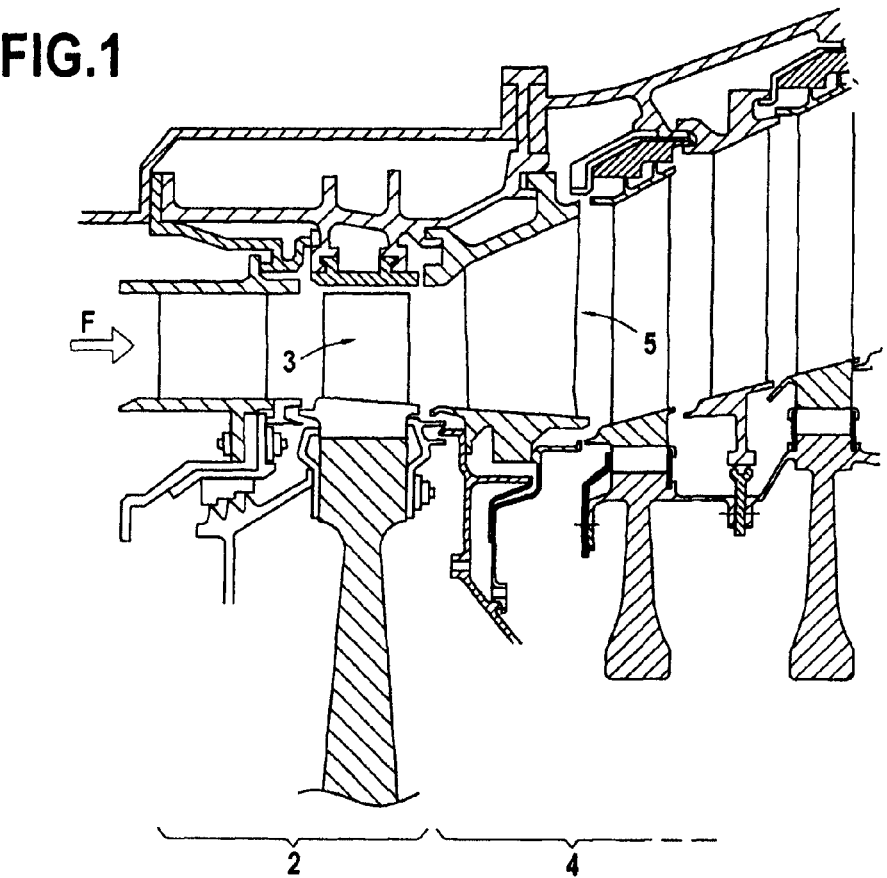
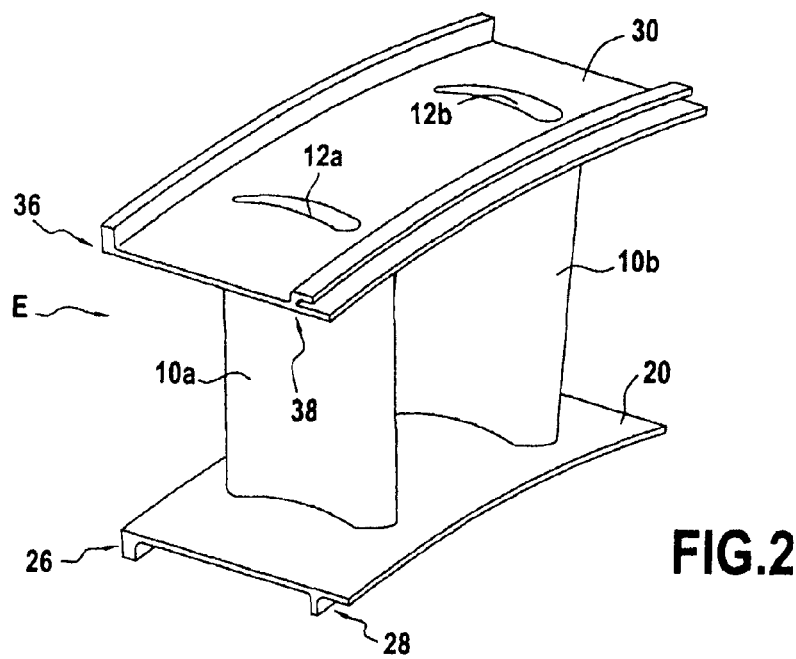

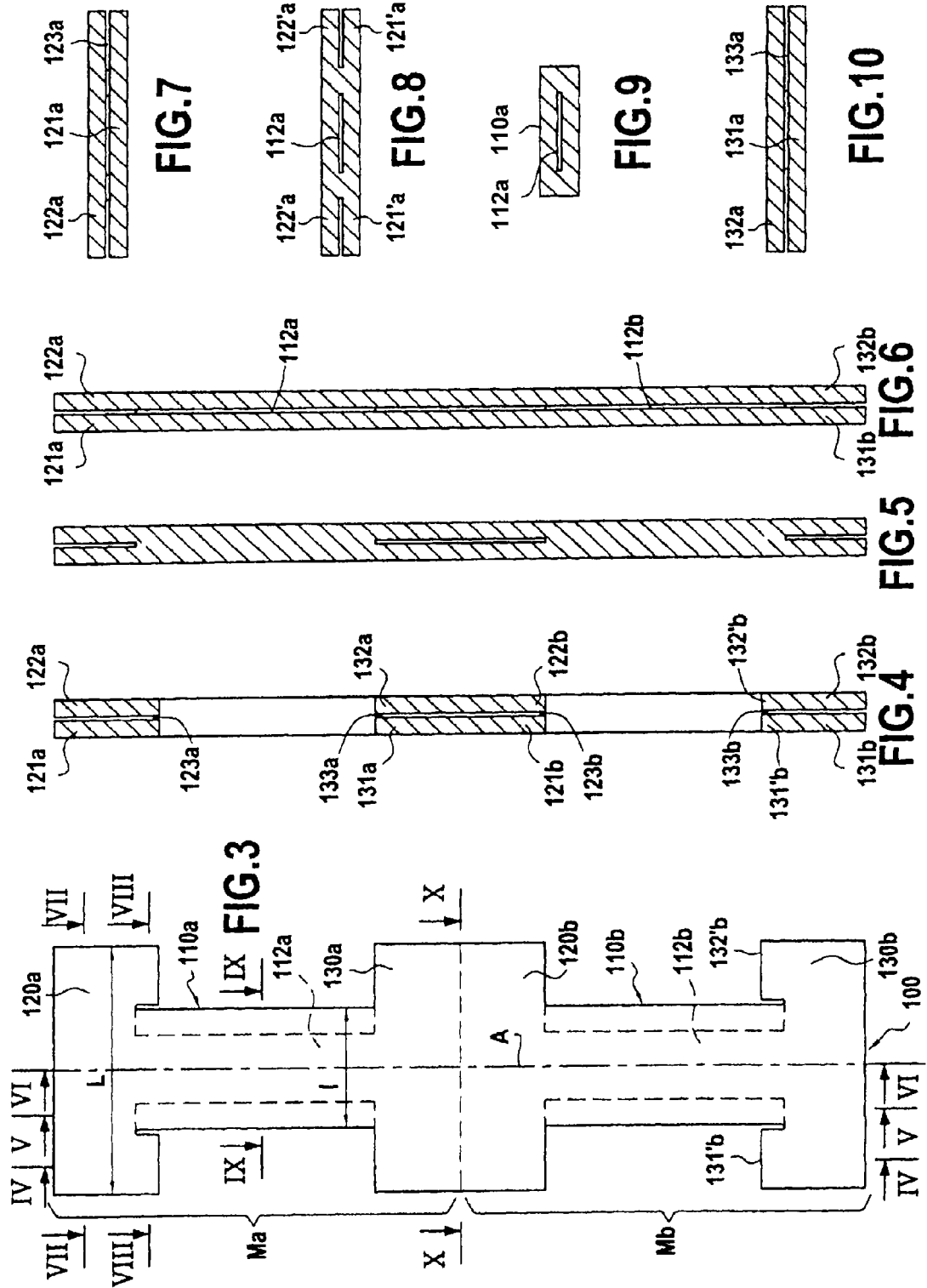

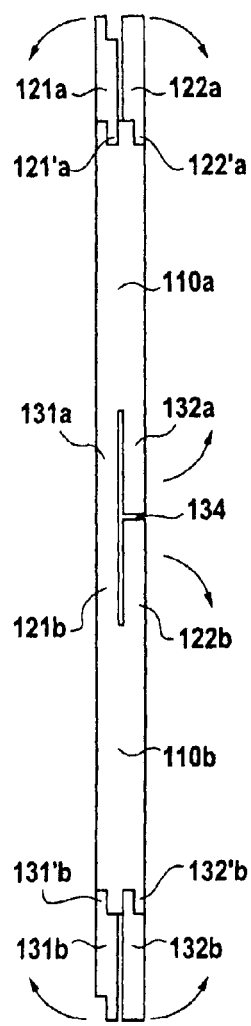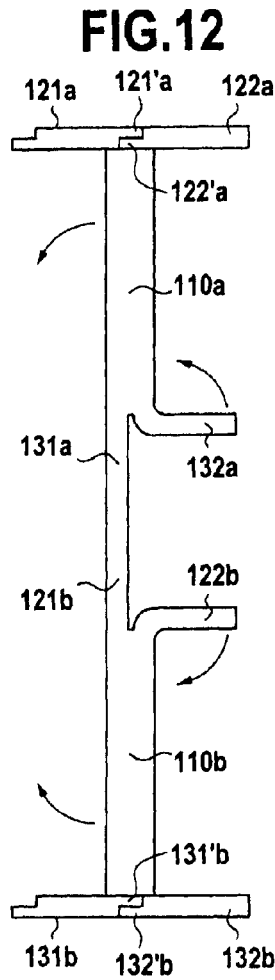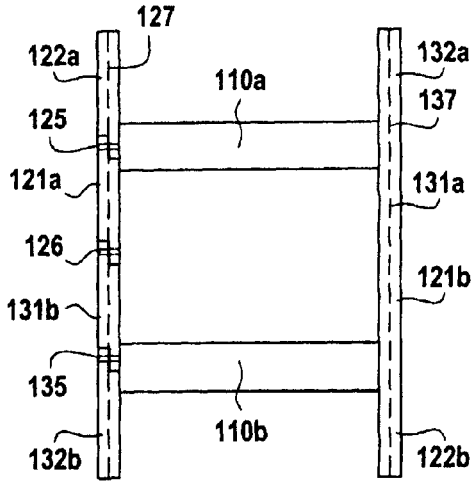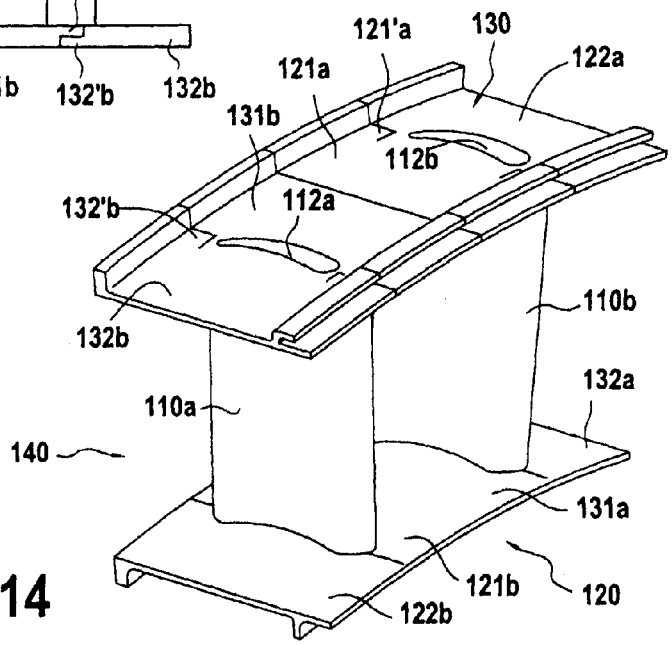

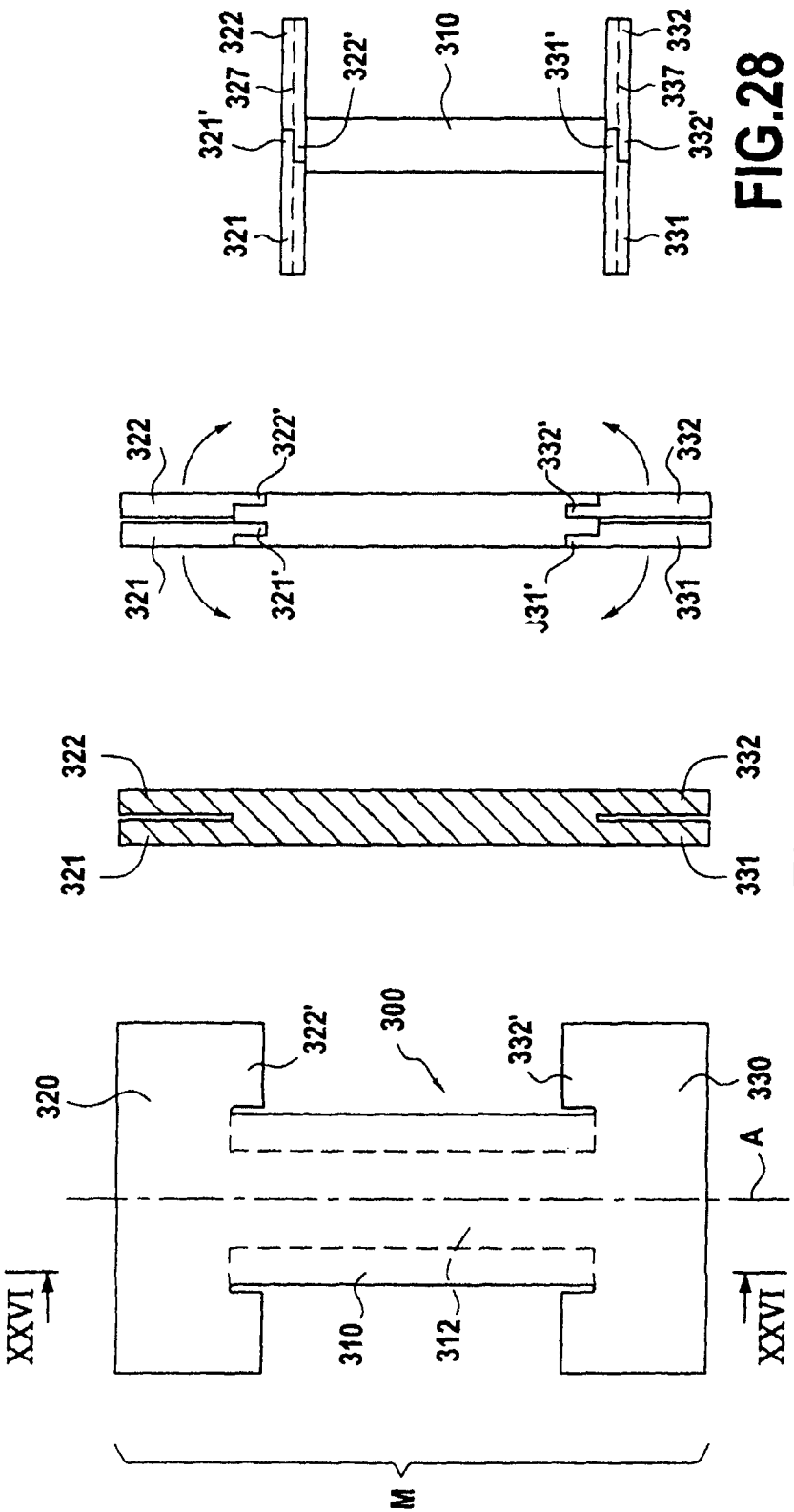

TURBINE DISTRIBUTOR ELEMENT MADE OF CMC, METHOD FOR MAKING SAME, DISTRIBUTOR AND GAS TURBINE INCLUDING SAME

The present application is a National Phase of International Application No. PCT/FR10/51149, filed Jun. 09, 2010 and claims priority from France Application Number 0954101, filed Jun. 18, 2009.

BACKGROUND OF THE INVENTION

The invention relates to a turbine nozzle made of composite material having a ceramic matrix or a matrix that is at least partially ceramic, and referred to below as CMC material.

The field of application of the invention is more particularly that of gas turbines for aviation or industry.

Improving the performance of gas turbines and reducing their polluting emissions is leading to ever-higher combustion temperatures being envisaged.

For the hot portions of a gas turbine, proposals have therefore been made to use CMC materials because of their remarkable thermostructural properties, i.e. because they associate mechanical properties that make them suitable for constituting structural elements with a capacity to conserve those mechanical properties at high temperatures. CMC materials are typically formed using fiber reinforcement made of refractory fibers, such as carbon fibers or ceramic fibers, and densified with a matrix that is ceramic or at least partially ceramic. As is well known, an interphase may be present between the fibers and the matrix in order to perform an embrittlement-release function for the composite material by deflecting cracks that reach the interphase. Such an interphase may be made of pyrolytic carbon (PyC), boron nitride (BN), or boron-doped carbon (BC). Embrittlement-release interphases of the same type may also be incorporated within the matrix, between phases of ceramic matrix. In any event, at least the outer phase of the matrix is ceramic.

Document EP 0 399 879 discloses a CMC turbine nozzle made up of a plurality of assembled-together portions, namely a hub carrying vanes and toothed rings that engage tenons formed at the radial ends of the vanes. The component parts of the turbine nozzle are obtained by machining solid CMC parts, thereby giving rise to large losses of material and leading to multiple ruptures of the fibers in the fiber reinforcement in the CMC.

Document EP 1 087 103 discloses a turbine nozzle element having a plurality of vanes extending between an inner annular platform sector and an outer annular platform sector. Each vane is made up of two portions: a CMC portion with braided fiber reinforcement beside the leading edge, and a solid ceramic portion beside the trailing edge. The platform sectors are made of CMC with fiber reinforcement built up from superposed plies. The braided reinforcement of the CMC portion of each vane extends beyond the longitudinal ends of the vane in order to be inserted between the fiber reinforcing plies of the platform sectors. The nozzle element is thus made in part only out of CMC and the fiber reinforcement is made up of a plurality of separate portions that need to be assembled together.

Document JP 2003-148 105 likewise discloses a nozzle element made of a single piece of ceramic matrix composite material. The fiber reinforcement is obtained in part from a woven blank in the form of a strip having a tubular central portion for forming a vane preform that is extended at each of its ends by flaps that face each other. The flaps are unfolded on either side of the central portion and they are stitched to separately-obtained fiber plies so as to form inner and outer platform preforms. The fiber structure occupying the entire volume of the nozzle element is thus made up of a plurality of separate portions that need to be assembled to one another.

Document WO 91/15357 discloses a turbine nozzle element made as a single piece out of ceramic matrix composite material. The fiber reinforcement is obtained from a blank in the form of a strip that may be woven, but that is preferably knitted. The strip is folded in half in order to obtain a fiber preform for the nozzle element. In the portion corresponding to a vane, the folding is performed in such a manner that the two edges of a segment of the strip take up juxtaposed positions and are connected together by stitching. There is thus discontinuity in the woven or knitted fiber reinforcement at the periphery of each vane along a line that extends in the longitudinal direction of the vane. Such a discontinuity is penalizing from a mechanical point of view.

Document EP 0 466 602 also discloses a single-piece nozzle element made of CMC obtained by densifying a fiber preform. The preform is obtained by shaping superposed plies or a three-dimensional woven texture. The nozzle element includes a vane with asymmetrical root portions and not with inner and outer platforms that extend on either side of the zone where they are connected to the vane.

OBJECT AND SUMMARY OF THE INVENTION

An object of the invention is to provide a CMC nozzle element that does not present the above-mentioned drawbacks.

This object is achieved by a one-piece turbine nozzle element made of composite material comprising fiber reinforcement densified by a matrix that is at least partially ceramic, the nozzle element comprising an inner annular platform sector, an outer annular platform sector, and at least one vane extending between the platform sectors and connected to both of them, the platform sectors extending on either side of their connection zones with the or each vane, the nozzle element being remarkable in that the fiber reinforcement comprises a fiber structure that is woven by three-dimensional or multilayer weaving and that presents continuity throughout the volume of the nozzle element and over the entire periphery of the or each vane.

The presence of a woven reinforcing fiber structure throughout the volume of the nozzle element, said structure presenting continuity throughout the volume of the nozzle element, i.e. not being made up by assembling a plurality of separately-obtained portions, and presenting continuity over the entire periphery of the or each vane, i.e. without any interruption of weaving in said periphery, contributes to obtaining good mechanical behavior. In addition, it is possible to obtain a single-piece reinforcing fiber structure directly.

The or each vane may be solid or it may present an internal longitudinal passage extending along the entire length of the vane and opening out into the platform sectors.

Also advantageously, the nozzle element includes at least two vanes extending between the platform sectors, and the fiber structure includes yarns that follow a continuous path extending successively along a portion of a first platform sector, along a first vane, along a portion of the other or second platform sector, along a second vane, and then along a portion of the first platform sector.

In another of its aspects, the invention provides a method that enables a turbine nozzle element as defined above to be fabricated.

Such a method comprises:

making a woven single-piece fiber blank by three-dimensional or multi-layer weaving, the blank comprising in a longitudinal direction at least one pattern including a first segment forming a vane preform blank, a second segment extending the first segment at one longitudinal end thereof and forming two flaps situated facing each other, and a third segment extending the first segment at its other end and forming two flaps situated facing each other;

unfolding the blank with relative pivoting between the flaps of the second segment and the first segment on either side thereof at its first end so as to cause the flaps of the second segment to extend substantially perpendicularly to the first segment, and with relative pivoting between the flaps of the third segment and the first segment on either side thereof at its second end in order to cause the flaps of the third segment to be substantially perpendicular to the first segment;

shaping the unfolded blank in order to obtain a fiber preform of the nozzle element with at least a vane preform-forming portion obtained by shaping the first segment, and platform sector preform-forming portions obtained from the flaps; and densifying the preform with a matrix that is at least partially ceramic such that a single-piece turbine nozzle element is obtained with fiber reinforcement comprising the fiber preform that presents continuity throughout the volume of the nozzle element and over the entire periphery of the or each vane.

Preferably, the blank is made with a second segment and a third segment of widths that are greater than the width of the first segment and extending laterally beyond the lateral edges of the first segment.

Under such circumstances, and advantageously, in at least one of the second and third segments, each of the two flaps is formed with tabs that, in the non-unfolded state, extend the portions of the flaps that project laterally beyond the longitudinal edges of the first segment, extending along said edges while being separate therefrom, and the tabs of a flap are caused to overlap mutually with the tabs of the other flaps when the blank is unfolded. The mutually overlapping tabs may be bonded together, e.g. by stitching or by implanting yarns or needles.

Also preferably, the fiber blank is made as a single piece with repetition of said pattern, the third segment of a first pattern and the second segment of a consecutive second pattern extending each other and being in continuity with each other, and while unfolding the blank, the first segment of the first pattern is caused to pivot in one direction relative to the third segment of the first pattern and the first segment of the second pattern is caused to pivot in the opposite direction relative to the second segment of the second pattern in order to cause the first segments of the first and second patterns to be substantially parallel to each other.

Under such circumstances, while unfolding the blank, a flap of the second segment of the first pattern and a flap of the third segment of a consecutive pattern are caused to extend each other in order to be capable of forming a portion of a platform sector preform. After the blank has been unfolded, the flaps that have been caused to extend each other are bonded together, e.g. by stitching or by implanting yarns or needles.

Advantageously, while performing multi-layer weaving of the blank, non-interlinked zones are formed between two layers in order to form the separations between the two flaps of a second segment and between the two flaps of a first segment.

Also advantageously, during multi-layer weaving of the blank, a non-interlinked zone is formed between two layers all along the first segment, the non-interlinked zone extending over a portion only of the width of the first segment, at a distance from its longitudinal edges, so that after shaping it forms a vane fiber-preform with an internal passage that extends over the entire length of the preform.

The invention also provides a turbine nozzle comprising a plurality of juxtaposed nozzle elements, each nozzle element being as defined above or being obtained by a method as defined above.

The invention also provides a gas turbine provided with such a turbine nozzle.

BRIEF DESCRIPTION OF THE DRAWINGS

The invention can be better understood on reading the following description given by way of non-limiting indication with reference to the accompanying drawings, in which:

FIG. 1 is a very fragmentary diagrammatic view in axial half-section of a portion of a gas turbine;

FIG. 2 is a diagrammatic perspective view of a turbine nozzle element;

FIG. 3 is a diagram of a woven fiber blank for making a fiber preform for a turbine nozzle element out of CMC in a first embodiment of the invention;

FIGS. 4, 5, and 6 are diagrammatic longitudinal section views on planes IV, V, and VI of FIG. 3;

FIGS. 7, 8, 9, and 10 are diagrammatic views in cross-section on planes VII, VIII, IX, and X of FIG. 3;

FIG. 11 is a diagram showing the FIG. 3 blank prepared for unfolding;

FIGS. 12 and 13 show the FIG. 11 blank when unfolded, respectively partially and completely;

FIG. 14 is a diagrammatic perspective view of a nozzle element preform after shaping the unfolded blank of FIG. 13;

FIG. 25 is a diagram showing a woven fiber blank for making a fiber preform for a turbine nozzle element out of CMC in a third embodiment of the invention;

FIG. 26 is a diagrammatic longitudinal section view on plane XXVI of FIG. 25;

FIG. 27 is a diagrammatic side elevation view of the blank of FIGS. 25 and 26 prepared for unfolding;

FIG. 28 shows the FIG. 27 blank when completely unfolded;

DETAILED DESCRIPTION OF EMBODIMENTS

Figure 15:
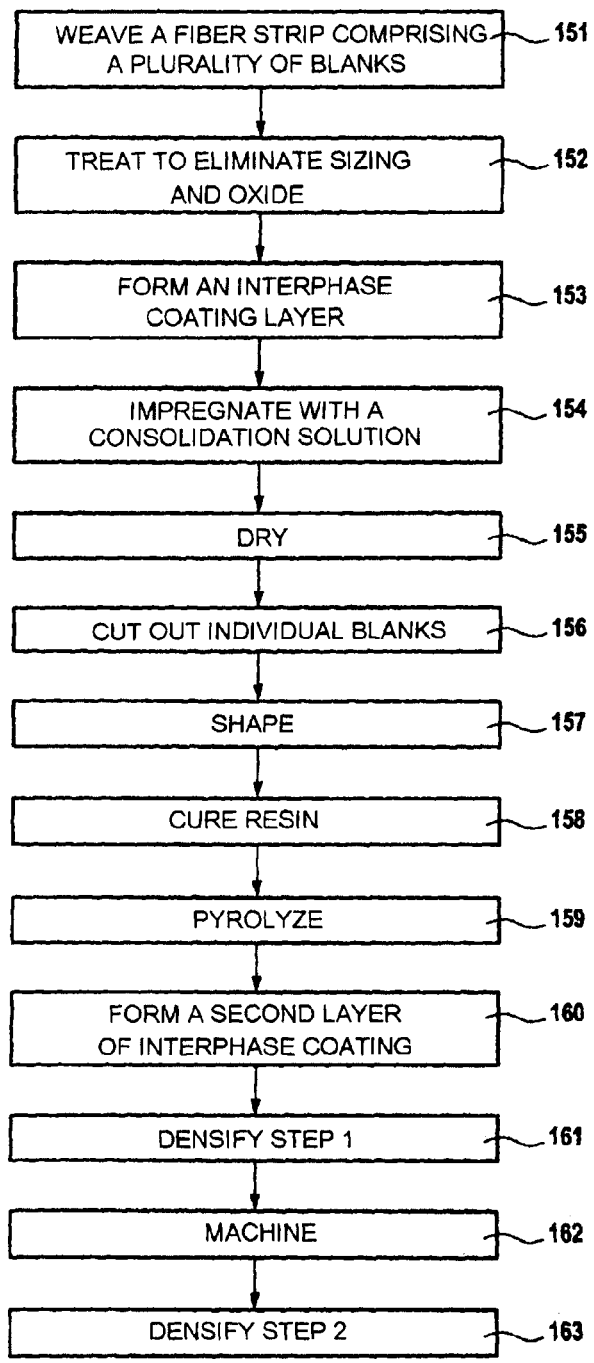
FIG. 15 shows the successive steps in a method of making a turbine nozzle element out of CMC.

The invention relates more particularly to a turbine nozzle for a gas turbine for aviation or for industry.

FIG. 1 is a very diagrammatic axial half-section view of a portion of a high-pressure (HP) turbine 2 and a portion of a low-pressure (LP) turbine 4 in a two-spool gas turbine. The HP turbine 2 receives gas (arrow F) from a combustion chamber via an HP turbine nozzle 3. The LP turbine 4 receives the gas downstream from the HP turbine 2 and comprises a plurality of turbine stages, each comprising an LP turbine nozzle such as 5 and a rotor wheel. The rotor wheels of the HP and LP turbines drive respectively an HP compressor and either an LP compressor or a fan via respective coaxial shafts, in well-known manner.

The nozzles of the HP and LP turbines are mounted in casings. Each nozzle comprises inner and outer annular platforms that define in part the flow passage for the gas stream, and a plurality of stationary vanes that extend between the platforms and that are connected thereto. The vanes may present respective internal longitudinal passages forming flow channels for cooling air.

It is known to make turbine nozzles as a single piece or as a plurality of elements that are juxtaposed to build up a complete nozzle, each element comprising an inner platform sector, an outer platform sector, and one or more vanes extending between them and connected thereto.

The invention is applied in this example to an HP turbine nozzle or to an LP turbine nozzle made up of a plurality of juxtaposed nozzle elements. More generally, the invention applies to a turbine nozzle in a single-spool or multi-spool gas turbine.

FIG. 2 shows an example of a turbine nozzle element that can be made in accordance with the invention.

The turbine nozzle element E comprises an inner annular platform sector 20, an outer annular platform sector 30, and in the example shown, two vanes 10a and 10b that extend between the platform sectors 20 and 30, being connected to both of them. It can be seen that the platform sectors extend on either side of connection zones with the vanes. The vanes present respective longitudinal passages 12a and 12b that open out at the ends of the vanes, in the outside surfaces of the platform sectors 20 and 30. At one and/or the other of their ends that are located upstream and downstream (in the flow direction of the gas stream), the platform sectors may present portions in relief such as rims 26, 36 or nibs 28, 38.

Reference is now made to FIGS. 3 to 10 which show a fiber structure or blank 100 from which it is possible to obtain a fiber preform for making a turbine nozzle element as shown in FIG. 2, the element being made as a single piece of CMC.

The blank 100 is made by multi-layer weaving, as described below. In the longitudinal direction A, the blank 100 comprises two similar successive patterns Ma and Mb that are shown separated by a dashed line in FIG. 3.

The pattern Ma includes a first segment 110a, a second segment 120a extending the segment 110a at a first longitudinal end thereof, and a third segment 130a extending the segment 110a at its other longitudinal end. In similar manner, the pattern Mb includes a first segment 110b, a second segment 120b extending the segment 110b at a first longitudinal end thereof, and a first segment 130b extending the segment 110b at its other longitudinal end. The segments 130a and 120b extend each other and are in continuity with each other.

The segments 110a and 110b are for forming fiber preform portions for the vanes 10a and 10b. The segments 110a and 110b in this example are approximately of the same width l that is substantially constant. Nevertheless, the segments 110a and 110b could be given varying width to mirror vanes 10a and 10b of varying transverse dimension, in the event of said transverse dimension varying significantly. In this example, the segments 120a, 130a, 120b, 130b are likewise approximately all of the same width L that is substantially constant. The width L is greater than the width l. The segments 120a and 130a extend laterally beyond the longitudinal edges of the segment 110a, on either side thereof. Similarly, the segments 120b and 130b extend laterally beyond the longitudinal edges of the segment 110b, on either side thereof.

As shown in FIGS. 4 to 10, at one longitudinal end of the blank 100, the segment 120a forms two flaps 121a and 122a that are situated facing each other on either side of a separation zone 123a, and that are connected to the first end of the segment 110a. Similarly, at the other longitudinal end of the blank 100, the segment 130b forms two flaps 131b and 132b that are situated facing each other on either side of a separation zone 133b and that are connected to the second end of the segment 110b. On either side of the segment 110a, the flaps 121a and 122a are extended by tabs 121'a and 122'a that extend over a limited distance along the longitudinal edges of the segment 110a, while being separated therefrom. Likewise, on either side of the segment 130b, the flaps 131b and 132b are extended by tabs 131'b and 132'b that extend over a limited distance along the longitudinal edges of the segment 130b, while being separate therefrom.

In the central portion of the blank 100, the segment 130a thus forms two facing flaps 131a and 132a that are situated on either side of a separation zone 133a and that are connected to the second end of the segment 110a, and the segment 120b forms two facing flaps 121b and 122b situated on either side of a separation zone 123b and connected to the first end of the segment 110b. The separations 123a, 133a, 123b, and 133b between the facing flaps may be obtained by making cuts after performing multi-layer weaving, or in the manner explained below by arranging non-interlinking zones during the multi-layer weaving.

Each of the segments 110a and 110b presents a respective separation zone 112a or 112b over its entire length that splits the segment into two facing portions over a middle portion only, the separation zone terminating at a distance from the longitudinal edges of the segments 110a or 110b. The separation zones 112a and 112b are for enabling longitudinal passages 12a and 12b to be formed in the vanes and they are situated at the same level as the separation zones between the flaps to which they are connected. The separation zones 112a and 112b may be obtained by making cuts after multi-layer weaving, or in the manner explained below by arranging for non-interlinked zones while performing multi-layer weaving.

The way in which the nozzle element preform is formed from the blank 100 is described below with reference to FIGS. 11 to 15.

A transverse incision 134 is formed over the entire width of the blank 100 and a portion of its thickness in order to separate the ends of the flaps 132a and 122b (FIG. 11). In addition, the thicknesses of the tabs 121'a, 122'a, 131'b, and 132'b are reduced by removing material so as to enable them to be superposed during subsequent unfolding of the blank 100 without forming significant extra thickness compared with the thickness of the flaps. The thicknesses of the tabs may be reduced substantially to one-half, as shown, or they may be reduced progressively to form a chamfer. Similar thickness reductions are performed at the ends of the flaps 121a and 131b. It should be observed that the flaps 131a and 121b remain connected together via their common end.

As shown by arrows in FIG. 11, the flaps 121a and 122a are caused to pivot on either side of the segment 110a, at the first end thereof, so as to cause them to be substantially perpendicular to the segment 110a, and the flaps 131b and 132b are caused to pivot on either side of the segment 110b, at the second end thereof, so as to cause them to be substantially perpendicular to the segment 110b. The tabs 121'a and 122'a overlap each other, as do the tabs 131'b and 132'b. In addition, the flap 132a is caused to pivot relative to the segment 110a at the second end thereof in order to cause it to extend substantially perpendicularly to the segment 110a, and the flap 122b is caused to pivot relative to the first end of the segment 110b in order to cause it to extend substantially perpendicularly to the segment 110b. The shape of the blank 100 is then as shown in FIG. 12.

The arrows in FIG. 12 show how unfolding is continued with the assembly formed by the flaps 121a and 122a, the segment 110a, and the flap 132a at the second end of the segment 110a being pivoted, and with the assembly formed by the flaps 131b and 132b, the segment 110b and the flap 122b at the second end of the segment 110b also being pivoted. As shown in FIG. 13, the segments 110a and 110b are thus caused to be substantially parallel to each other and the thinned-down ends of the flaps 121a and 131b overlap mutually.

In order to make it easier for the blank, as unfolded in the shape shown in FIG. 13, to stay in shape, the mutually overlapping tabs 121'a and 122'a, and likewise 131'b and 132'b, and also the mutually overlapping ends of the flaps 121a and 131b may be connected together, e.g. by stitches (125, 135, and 126). Other connection techniques could be used, for example yarns or needles could be implanted.

As shown in FIG. 13, the unfolded blank is of a shape that is close to that of the nozzle element that is to be made. The preform of the nozzle element is shaped by means of tooling including elements for shaping the preforms of the inner and outer platform sectors, elements for shaping the outside shapes of the vane preforms, and elements for shaping their longitudinal internal passages, which shaper elements penetrate into the separation zones 112a and 112b.

FIG. 14 is a diagram of the resulting preform 140 that enables the nozzle element of FIG. 2 to be obtained. The portion forming the preform 120 of the inner platform is formed by the flap 132a, the flaps 131a and 121b (which have remained connected to each other at their common end), and the flap 122b. The portion forming the preform 130 of the outer platform is formed by the flaps 122a, 121a, 131b, and 132b. The preform portions for the vanes are formed by the segments 110a and 110b. In order to obtain portions of a shape close to that of the nibs at the ends of the platform preforms, incisions 127 and 137 may be formed in the manner shown in FIG. 13.

Successive steps of a method of fabricating the FIG. 2 nozzle element out of CMC are summarized in FIG. 15.

Figure 16:
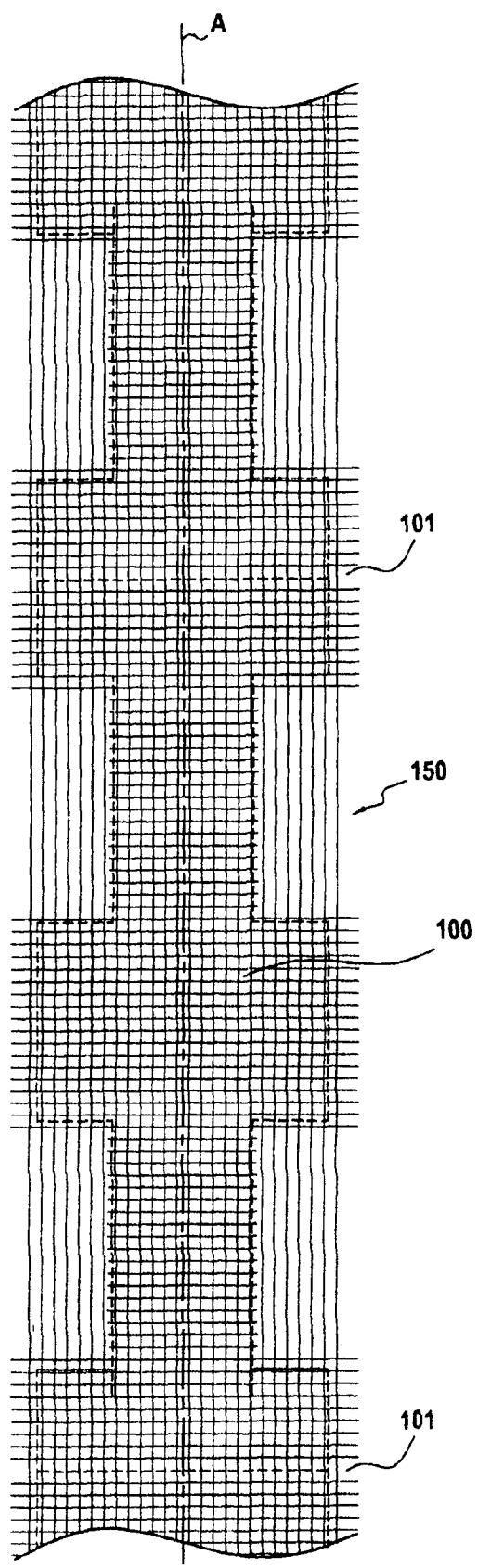
FIG. 16 is a diagram of a woven strip from which blanks of the kind shown in FIG. 13 can be cut out.

In step 151, a fiber strip 150 of the kind shown in FIG. 16 is woven by three-dimensional (3D) weaving or by multi-layer weaving so as to provide a row of consecutive fiber blanks 100. In the example shown, the longitudinal direction A of the blanks 100 extends in the warp direction, i.e. in the longitudinal direction of the strip 150. In a variant, they could be oriented in the weft direction, in the transverse direction of the strip 150. In addition, several parallel rows of blanks could be woven across the width of the strip 150.

The strip 150 is woven with ceramic fiber yarns, e.g. fiber yarns based on SiC such as those supplied for example by the Japanese supplier Nippon Carbon under the name "Nicalon". Nevertheless, it is possible to envisage using yarns made of carbon fibers.

Figure 17:
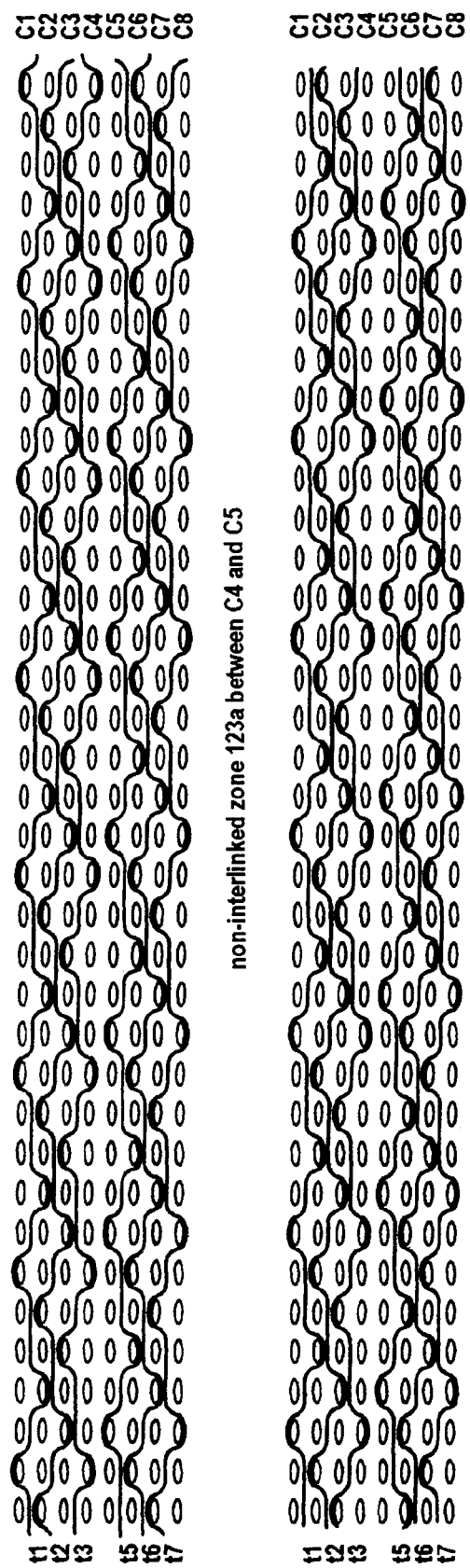
FIGS. 17, 18, and 19 are diagrams each showing two consecutive planes of a multi-layer weave for portions of the FIG. 3 fiber blank and corresponding to the sections of FIGS. 7, 8, and 9.
Figure 18:
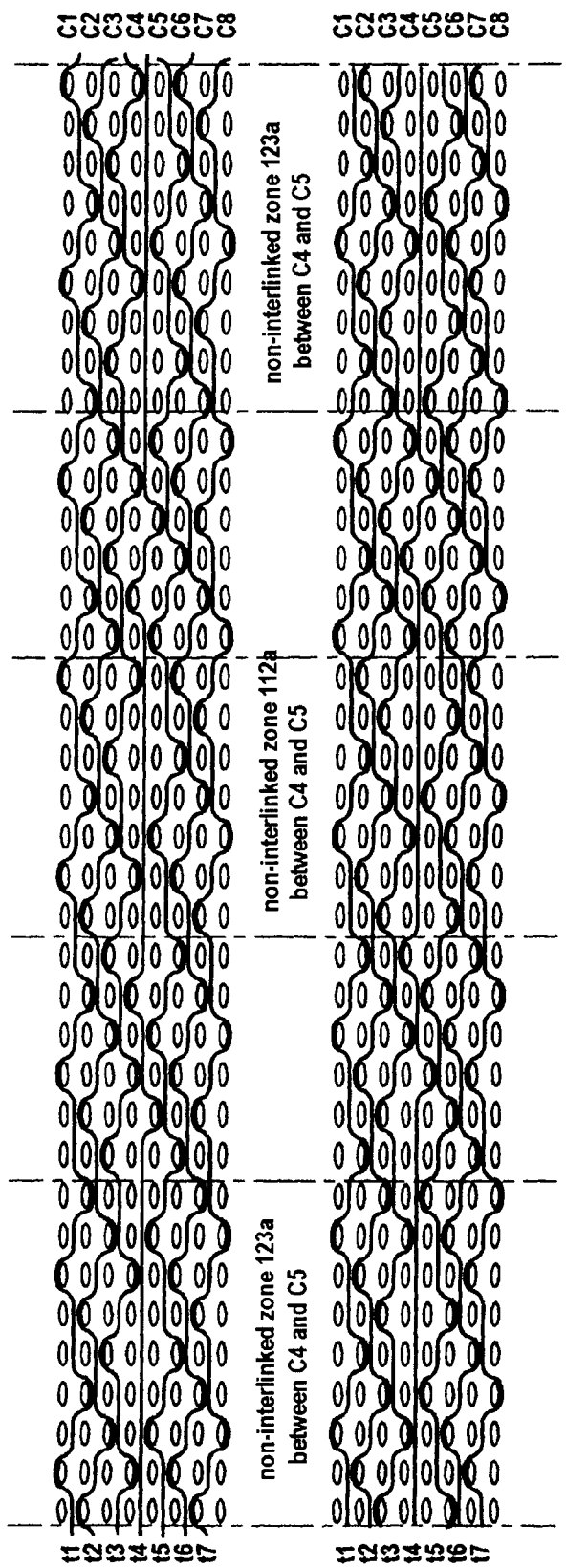
Figure 19:
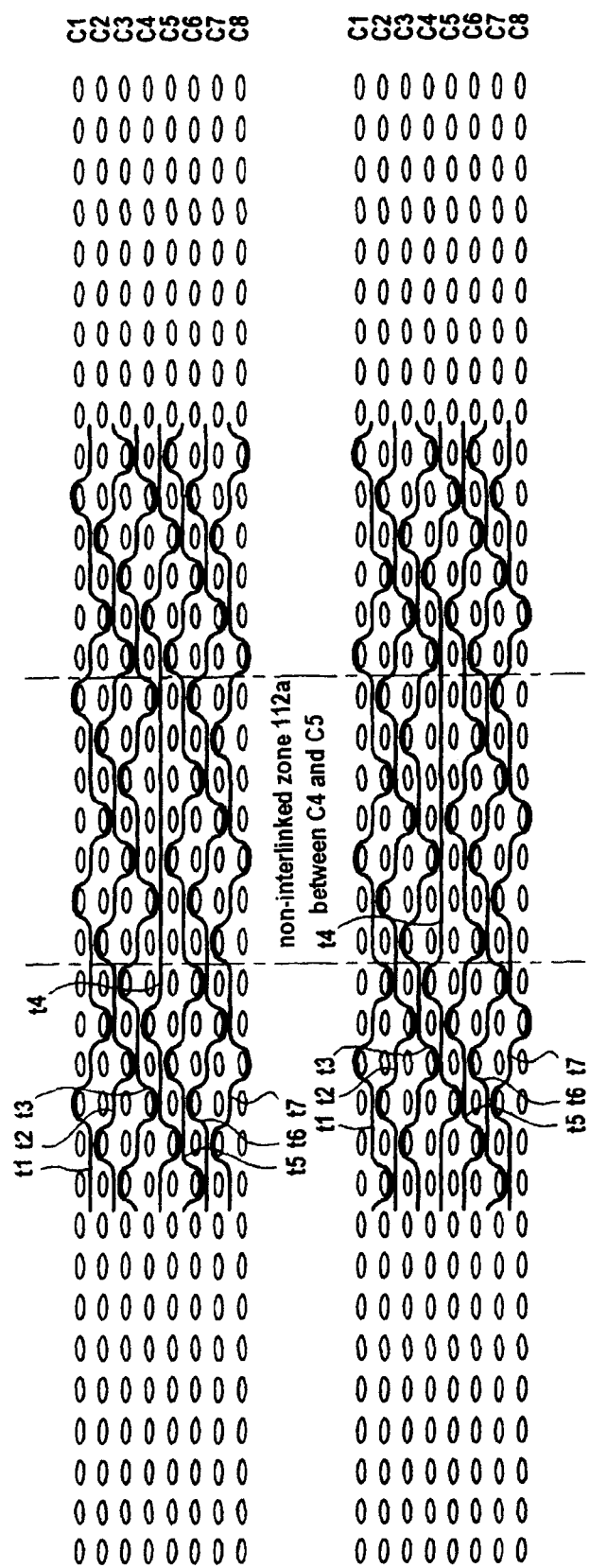

FIGS. 17, 18, and 19 are yarn section views on a larger scale showing two consecutive planes of the weave used for the portions of the blank 100 that correspond to the cross-sections of FIGS. 7, 8, and 9, respectively.

The strip 150 comprises a set of layers of warp yarns, with the number of these layers being equal to eight in this example (layers $C_1$ to $C_8$), with the warp yarns being linked together by weft yarns. In the example shown, the weaving is multi-layer weaving performed with a satin or multi-satin weave. Other types of 3D or multi-layer weaving could be used, e.g. multi-layer weaving using a multi-plain weave or weaving with an interlock type weave. The term "interlock" weaving is used herein to mean weaving with a weave in which each layer of warp yarns interlinks a plurality of layers of weft yarns with all of the yarns in a given weft column moving in the same manner in the weave plane. Various 3D or multi-layer weaving techniques are described in particular in document WO 2006/136755.

In the segment 120a of a blank 100, FIG. 17 shows weft yarns $t_1$ to $t_3$ that link together the layers of warp yarns $C_1$ to $C_4$ and weft yarns $t_5$ to $t_7$ that link together the layers of warp yarns $C_5$ to $C_8$, the layers $C_4$ and $C_5$ not being linked together so as to leave a non-interlinked zone forming the separation 123a between the flaps 121a and 122a. The same procedure is performed in the segments 120b, 130a, and 130b of the blank 100.

In the portion adjacent to the first end of the segment 110a, FIG. 18 shows the weft yarns $t_1$ to $t_3$ that link together the layers of warp yarns $C_1$ to $C_4$ and the weft yarns $t_5$ to $t_7$ that link together the layers of warp yarns $C_5$ to $C_8$. Non-interlinked zones are arranged between the layers $C_4$ and $C_5$ of warp yarns so as to form the separations 123a between the tabs 121'a and 122'a of the flaps 121a and 122a and so as to form the separation zone 112a in the central portion of the segment 110a. The layers $C_4$ and $C_5$ are linked together by warp yarns $t_4$ in the lateral portions of the segment 110a. The same procedure is performed in the portion adjacent to the second end of the segment 110b.

In the remainder of the segment 110a, FIG. 19 shows how a central non-interlinked zone is arranged between the layers $C_4$ and $C_5$ of warp yarns in order to form the separation zone 112a in the central portion of the segment 110a, as in FIG. 18. The layers $C_4$ and $C_5$ are linked together at the lateral portions of the segment 110a, as in FIG. 18. The same procedure is performed for the segment 110b. The warp yarns that extend on either side of the segments 110a and 110b for making the segments 120a, 130a, 120b, and 130b are not woven in the segments 110a and 110b.

In the strip 150, extra-length zones 101 (FIG. 16) are provided between consecutive blanks in order to provide margins for cutting.

In step 152, the strip is preferably treated to eliminate the sizing present on the fibers, e.g. by short heat treatment, and to eliminate the presence of oxide on the surfaces of the fibers, e.g. by hydrofluoric acid treatment.

In step 153, a thin interphase coating layer is formed on the fibers of the fiber strip by chemical vapor infiltration (CVI). By way of example, the interphase coating material is pyrolytic carbon (PyC), boron nitride (BN), or boron-doped carbon (BC, e.g. having 5% at to 20% at of B, with the balance being C). The thin interphase coating layer is preferably of small thickness, e.g. no greater than 100 nanometers (nm), or indeed no greater than 50 nm, so as to conserve good capacity for deformation in fiber blanks. The thickness is preferably at least 10 nm.

In step 154, the fiber strip with fibers coated in a thin interphase coating layer is impregnated with a consolidation composition, typically a resin that is possibly diluted in a solvent. It is possible to use a carbon-precursor resin, e.g. a phenolic or a furanic resin, or a ceramic-precursor resin, e.g. a polysilazane, polysiloxane, or polycarbosilane resin as a precursor for SiCN, SiCO, and SiC, respectively.

After drying by eliminating any resin solvent (step 155), the individual fiber blanks 100 are cut out (step 156). During cutting out, the portions of warp yarns that extend between the segments 120*a* and 130*a* on either side of the segment 110*a* are eliminated, as are the warp yarn portions that extend between the segments 120*b* and 130*b* on either side of the segments 110*b*. In addition, incisions are made to separate the tabs 121'*a* and 122'*a* from the segment 110*a*, and to separate the tabs 131'*b* and 132'*b* from the segment 110*b*.

In step 157, a fiber blank as cut out in this way is prepared, unfolded, and shaped by means of shaper tooling, e.g. made of graphite so as to obtain the preform 140 as described above with reference to FIGS. 11 to 14.

Thereafter, the resin is cured (step 158) and the cured resin is pyrolyzed (step 159). Curing and pyrolysis may follow on one from the other by progressively raising the temperature in the shaper tooling.

After pyrolysis, a fiber preform is obtained that has been consolidated by the pyrolysis residue. The quantity of consolidation resin is selected so that the pyrolysis resin binds the fibers of the preform together sufficiently to enable the preform to be handled while retaining its shape without assistance from tooling, it being understood that the quantity of consolidation resin is preferably selected to be as little as possible.

Steps of eliminating sizing, performing acid treatment, and forming an interphase coating on a substrate of SiC fibers are already known. Reference may be made to document U.S. Pat. No. 5,071,679.

A second interphase layer may be performed by CVI (step 160), if necessary, for obtaining an overall fiber-matrix interphase that presents thickness that is sufficient to perform an embrittlement-release function for the composite material. The second interphase layer may be a material selected from PyC, BN, and BC, and it need not necessarily be the same as the material of the first interphase layer. The thickness of the second interphase layer is preferably not less than 100 nm.

The consolidated preform is then densified with a ceramic matrix. This densification may be performed by CVI, thus making it possible for the formation of the second interphase layer and the densification by means of the ceramic matrix to be performed one after the other in the same oven.

CVI densification of a preform by means of a ceramic matrix, in particular an SiC matrix, is well known. A reaction gas containing methyltrichlorosilane (MTS) and hydrogen gas ($H_2$) may be used. The consolidated preform is placed in the enclosure, without help from shape-maintaining tooling, and the gas is introduced into the enclosure. Under controlled conditions, of temperature and pressure in particular, the gas diffuses into the pores of the preform so as to deposit the SiC matrix by reaction between the constituents of the gas.

Naturally, depending on the desired nature of the composite material, the method may be implemented using a fiber strip made of fibers other than ceramic fibers, e.g. carbon fibers. The acid treatment for eliminating the oxide layer is then omitted.

Likewise, CVI densification of the consolidated preform may be performed with a matrix other than an SiC matrix, in particular a carbon matrix or a self-healing matrix, with examples of self-healing matrix materials being an Si—B—C ternary system or boron carbide $B_4C$. Reference may be made to documents U.S. Pat. Nos. 5,246,736 and 5,965,266, which describes obtaining such self-healing matrices by CVI.

Densification may be performed in two successive steps (steps 161 and 163), which steps are separated by a step 162 of machining the part being fabricated to the desired dimensions. The second densification step serves not only to finish off densification to the core of the composite material, but also to form a surface coating on any fibers that might be laid bare during machining.

It should be observed that pre-machining or trimming may be performed between steps 158 and 159, i.e. after curing and before pyrolyzing the resin.

In a variant, after weaving the fiber strip 150 and performing treatments to eliminate sizing and oxide, individual fiber blanks 100 are cut out from the fiber strip, and then each individual fiber blank is unfolded, and shaped by shaper tooling in which it is held in order to form the embrittlement-release interphase coating by CVI.

With the preform still being held in shape in the shaper tooling, it is consolidated by partial densification, the consolidation being performed by forming a deposit of ceramic on the fibers by CVI.

The formation of the interphase coating by CVI and the consolidation by ceramic deposition by CVI may follow on one from the other in the same CVI oven.

The shaper tooling is preferably made of graphite and presents holes that facilitate passage of reaction gases for depositing the interphase and for depositing the ceramic by CVI.

When consolidation is sufficient to allow the preform to be handled while conserving its shape without assistance from support tooling, the consolidated preform is extracted from the shaper tooling and the densification with a ceramic matrix by CVI is performed.

Figure 20:
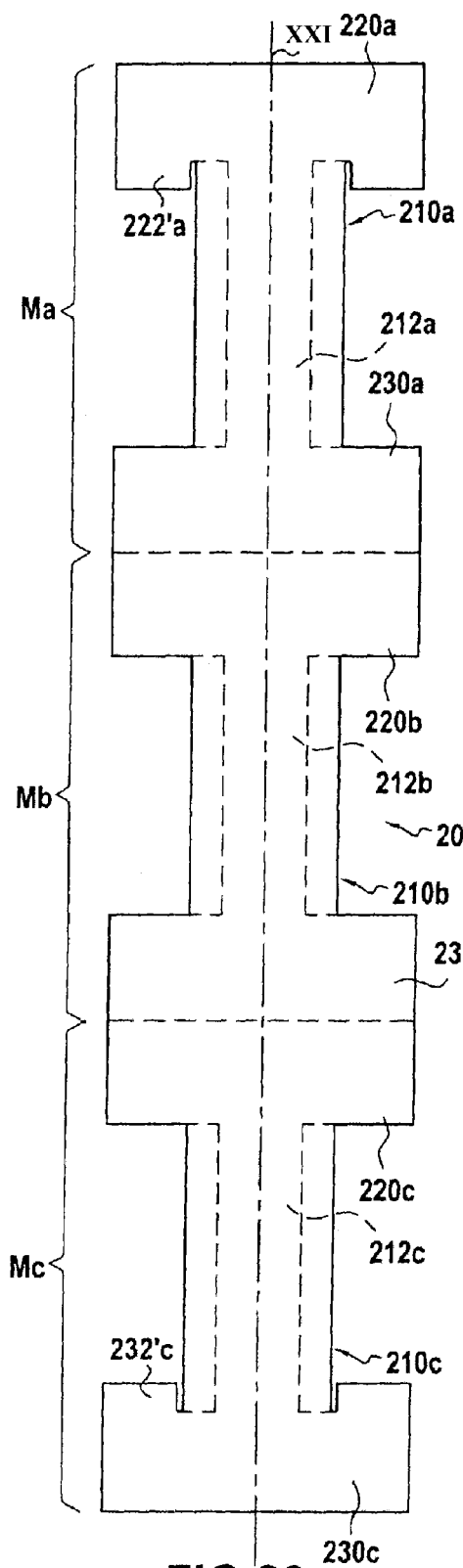
FIG. 20 is a diagram of a woven fiber blank for making a fiber preform for a turbine nozzle element out of CMC in a second embodiment of the invention.
Figure 21:
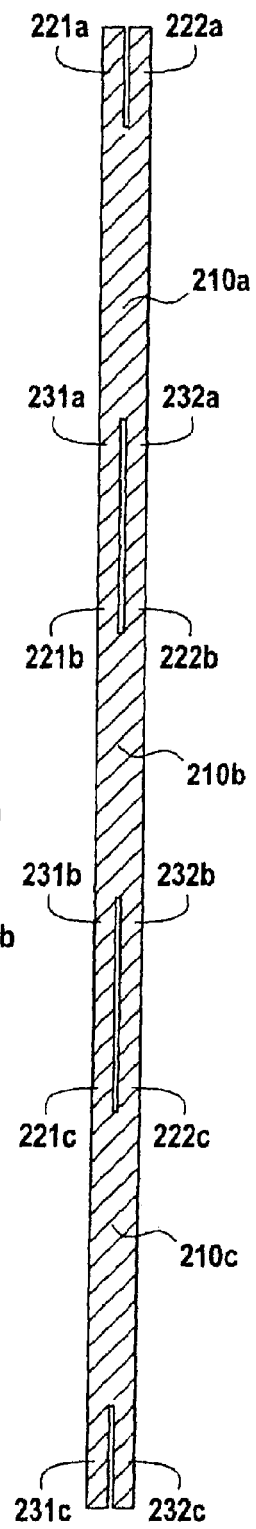
FIG. 21 is a diagrammatic longitudinal section view on plane XXI of FIG. 20.
Figure 22:
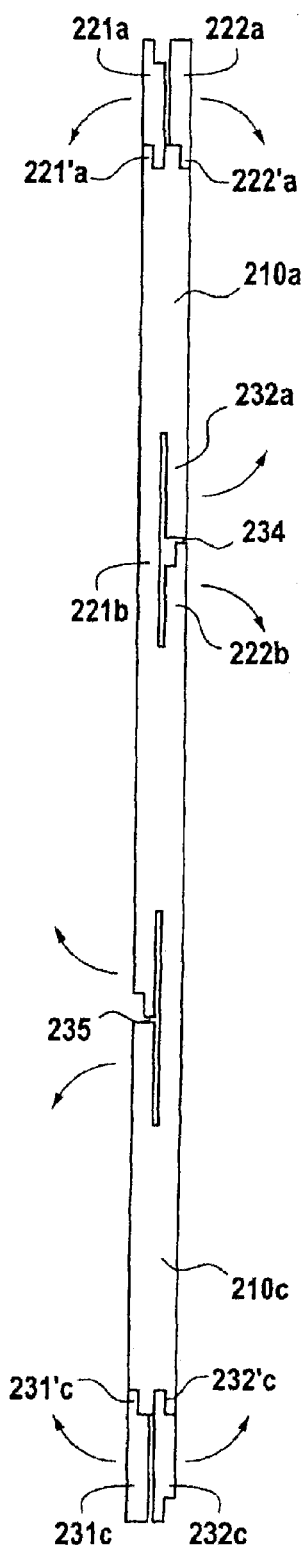
FIG. 22 is a diagrammatic side elevation view showing the blank of FIGS. 20 and 21 prepared for unfolding.

FIGS. 20 to 22 show a fiber blank 200 from which it is possible to obtain a fiber preform that serves to make a turbine nozzle element as a single piece out of CMC, the element comprising an inner platform sector, and outer platform sector, and three vanes extending between the platform sectors and connected to both of them.

In the longitudinal direction A, the blank 200 comprises three similar patterns Ma, Mb, and Mc that are similar to the patterns Ma and Mb of the above-described blank 100 and that are shown as being separated by dashed lines.

Thus, the pattern Ma includes a first segment 210*a* for forming a preform portion for a first vane, a second segment 220*a* extending the first segment 210*a* at a first longitudinal end thereof and forming two flaps 221*a* and 222*a* situated facing each other, and a third segment 230*a* extending the segment 210*a* at its other longitudinal end and forming two flaps 231*a* and 232*a* situated facing each other.

The pattern Mb includes a first segment 210*b* for forming a preform portion of a second vane, a second segment 220*b* extending the first segment 210*b* at a first longitudinal end thereof and forming two flaps 221*b* and 222*b* situated facing each other, and a third segment 230*b* extending the segment 210*b* at its other longitudinal end and forming two flaps 231*b* and 232*b* situated facing each other.

The pattern Mc includes a first segment 210*c* for forming a preform portion for a third vane, a second segment 220*c* extending the first segment 210*c* at a first longitudinal end thereof and forming two flaps 221*c* and 222*c* situated facing each other, and a third segment 230c extending the segment 210c at its other longitudinal end and forming two flaps 231c and 232c situated facing each other.

The segments 230a and 220b extend each other and are in continuity with each other, as are the segments 230b and 220c. In each pattern, the second and third segments are of a width that is greater than the width of the first segment and they extend beyond the level of the longitudinal edges thereof. On either side of the segment 210a, the flaps 221a and 222a are extended by tabs 221'a and 222'a in the same manner as the flaps 121a and 122a of the blank 100. Similarly, on either side of the segment 230c, the flaps 231c and 232c are extended by tabs 231'c and 232'c in the same manner as the flaps 131b and 132b of the blank 100.

The segments 210a, 210b, and 210c are of the same width that is substantially constant. Nevertheless, they could be of varying width when the transverse dimensions of the vanes in the nozzle element being fabricated vary significantly. In the same manner as the segments 110a and 110b, each of the segments 210a, 210b, and 210c presents a respective separation zone 212a, 212b, or 212c along its entire length that is formed in a middle portion only. These separation zones terminate at a distance from the longitudinal edges of the segments 210a, 210b, and 210c and they run into separation zones between flaps.

In the same manner as the blank 100, the blank 200 is cut out from a continuous woven strip containing one or more rows of blanks. Weaving is of the 3D or multi-layer type. The separation zones between the flaps of the segments 220a, 230a, 220b, 230b, 220c, and 230c and in the middle portions of the segments 210a, 210b, and 210c may be formed by providing non-interlinked zones during weaving, as described above, or by making cuts after weaving.

As shown in FIG. 22, the blank 200 is prepared for unfolding by making incisions 234 and 235 so as to separate the ends of the flaps 232a and 222b, and so as to separate the ends of the flaps 231b and 221c. Thickness reductions may also be performed in the tabs 221'a, 222'a, 231'c, and 232'c, and in the end portions of the flaps 221a, 231b, and 231c in order to avoid extra thickness when they are superposed after the blank has been unfolded, in the same manner as for the blank 100. The flaps 231a and 221b remain connected together at their ends, as do the flaps 232b and 222c.

Figures 23, 24:
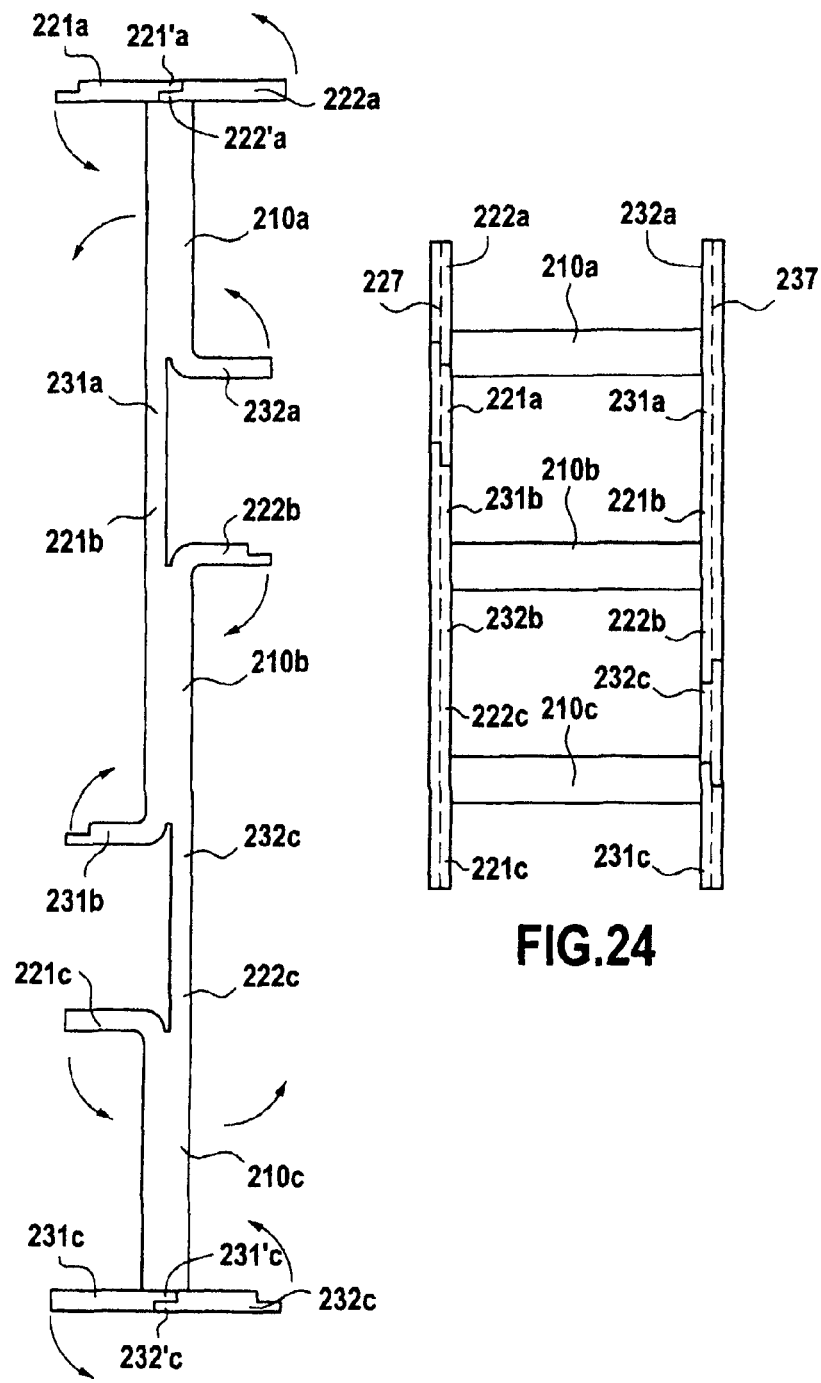
FIGS. 23 and 24 show the FIG. 22 blank when unfolded, respectively partially and completely.

FIG. 23 shows the blank 200 partially unfolded after the flaps 221a, 222a, 232a, 222b, 231b, 221c, 231c, and 232c have been pivoted, as shown by the arrows in FIG. 22, the flaps then extending substantially perpendicularly to the longitudinal direction A.

FIG. 24 shows the blank 200 in the fully unfolded state after the assembly formed by the flaps 221a and 222a, the segment 210a, and the flap 232a, and the assembly formed by the flap 231b, the segment 210b, and the flap 222b, and the assembly formed by the flaps 231c and 232c, the segment 210c, and the flap 221a have all been pivoted as shown by the arrows in FIG. 23.

The tabs and the end portions of the mutually overlapping flaps may be bonded together by stitching or by implanting yarns or needles.

The unfolded blank is shaped by means of shaper tooling having elements for shaping inner and outer platform sector preforms, elements for shaping the outside shapes of the preforms of the vanes, and elements for shaping their longitudinal internal passages, the latter shaper elements penetrating into the separation zones 212a, 212b, and 212c.

It is thus possible to obtain a nozzle element preform in which: the inner platform preform portion is made up of the flap 232a, the flaps 231a and 221b, the flap 222b, the flap 232c, and the flap 231c, the outer platform preform portion is made up of the flap 222a, the flap 221a, the flap 231b, the flaps 232b and 222c, and the flap 221c, and the vane preform portions are formed by the segments 210a, 210b, and 210c. Incisions 227 and 237 may be formed to obtain the shapes of the nibs at one of the ends of the platform preforms.

The complete process for fabricating the nozzle element out of CMC may comply with the process described with reference to FIG. 15.

FIGS. 25 and 26 show a fiber blank 300 from which it is possible to obtain a fiber preform for making a turbine nozzle element as a single piece of CMC with an inner platform sector, an outer platform sector, and a single vane extending between the platform sectors and connected to both of them.

In the longitudinal direction A, the blank 300 comprises a pattern M that includes: a first segment 310 for forming a preform portion of the turbine nozzle vane, a second segment 320 extending the first segment 310 at one longitudinal end thereof and forming two flaps 321 and 322 situated facing each other, and a third segment 330 extending the segment 310 at its other longitudinal end and forming two flaps 331 and 332 that are situated facing each other.

The segments 320 and 330 are of a width that is greater than the width of the segment 310 and they extend beyond the longitudinal edges thereof. On either side of the segment 310, the flaps 321 and 322 are extended by tabs 321' and 322' in the same manner as the flaps 121a and 122a of the blank 100, while the flaps 331 and 332 are extended by tabs 331' and 332' in the same manner as the flaps 131b and 132b of the blank 100.

The segment 310 is of a width that is substantially constant. Nevertheless, it may be given a varying width in order to mirror a varying transverse dimension of the turbine nozzle vane when said transverse dimension varies in significant manner. The segment 310 presents over its entire width a separation zone 312 formed in a middle portion only, the separation zone terminating at a distance from the longitudinal edges of the segment 310.

In the same manner as the blank 100, the blank 300 is cut out from a continuous woven strip containing one or more rows of blanks. The weaving is of the 3D or multi-layer type. The separation zones between the flaps 321 and 322, between the flaps 331 and 332, and in the segment 310 may be formed by arranging for non-interlinked zones during the weaving, as described above, or else by forming cuts after weaving.

As shown in FIG. 27, the blank 300 is prepared for unfolding by forming thickness reductions in the tabs 321', 322', 331', and 332' in order to avoid extra thickness when they are superposed after the blank has been unfolded.

FIG. 28 shows the blank 300 unfolded by pivoting the flaps 321, 322, 331, and 332 as shown by the arrows in FIG. 27, the flaps then extending substantially perpendicularly to the longitudinal direction A. The mutually overlapping tabs 321' and 322' may be bonded together by stitching or by implanting yarns or needles, as can the tabs 331' and 332'.

The unfolded blank is shaped by means of shaper tooling having shaper elements for the inner and outer platform sector preforms, shaper elements for the outside shape of the vane preform, and a shaper element for the longitudinal passage in the vane preform, the latter shaper element penetrating into the separation zone 312.

This provides a nozzle element preform in which: the inner platform preform portion is made up of the flaps 331 and 332, the outer platform preform portion is made up of the flaps 321 and 322, and the vane preform is constituted by the segment 310. Incisions 327 and 337 may be formed in order to obtain the shapes of nibs at one end of each of the platform preforms.

The complete process for fabricating the nozzle element out of CMC may comply with that described with reference to FIG. 15.

The above description relates to embodiments of CMC nozzle elements having one, two, or three vanes. Naturally, the number of vanes could be greater by forming fiber blanks having the desired number of consecutive patterns, such as the patterns Ma, Mb, and Mc.

Furthermore, in the description above, the nozzle elements are described as being made with one or more hollow vanes, each having a longitudinal internal passage. Nevertheless, the invention is also applicable to making nozzle elements with one or more solid vanes. With solid vanes, during the weaving of the fiber blank, no non-interlinked zone is provided in any portion that is to constitute a vane preform.

The above description relates to fabricating a nozzle element of the kind shown in FIG. 2 in which the inner and outer platform sectors extend substantially parallel to each other.

Figure 29:
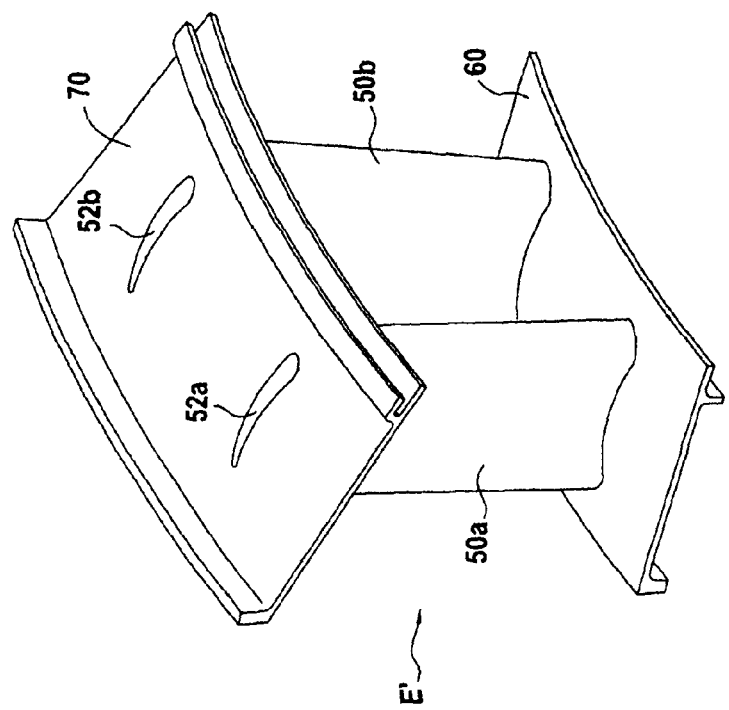
FIG. 29 is a diagrammatic perspective view of another nozzle element.

Nevertheless, the invention is also applicable to the situation in which the CMC nozzle element E' that is to be fabricated presents inner and outer platform elements 60 and 70 that are not mutually parallel, as shown in FIG. 29. In this example, as in FIG. 2, the nozzle element has two vanes 50a and 50b that extend between the platform sectors 60 and 70, being connected thereto and presenting internal longitudinal passages 52a and 52b extending along their entire length. The platform sectors extend on either side of vane connection zones.

Figure 30:
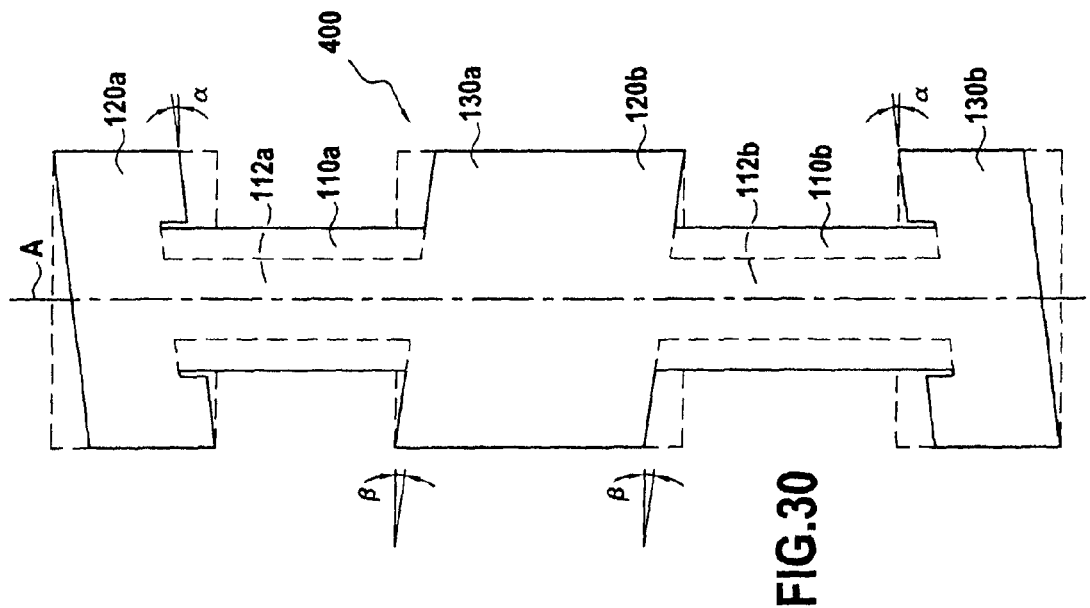
FIG. 30 is a diagram showing a woven blank for making a fiber preform for a nozzle element of the kind shown in FIG. 29, the element being made of CMC.

A fiber preform for making the nozzle element E' may be obtained by unfolding a fiber blank that has been woven using 3D or multi-layer weaving, such as the blank 400 in FIG. 30. For reasons of simplicity, the elements of the blank 400 are given the same references as the elements of the blank 100 in FIG. 3 that have the same functions.

The blank 400 differs from the blank 100 in that the connection between the first segment of one pattern and at least one of the second and third segments of the same pattern extends at a non-zero angle relative to the normal to the longitudinal direction A.

Thus, as shown in FIG. 30, the segment 120a is connected to the segment 110a so as to form a non-zero angle α relative to the normal to the direction A, and the segment 130a is connected to the segment 120a by forming a non-zero angle β relative to the normal to the direction A. In this example, the angles α and β are of opposite signs. In similar manner, the segment 130b is connected to the segment 110b by forming an angle that is substantially equal to α, and the segment 120b is connected to the segment 110b by forming an angle that is substantially equal to β.

The blank 400 is unfolded in the same manner as the blank 100.

The blank 400 is cut out from a continuous woven strip, like the blank 100. It is possible to perform 3D or multi-layer weaving of the portion defined by the outline drawn in dashed lines in FIG. 30, and then to make cuts so as to obtain the profile of the blank 400. It is also possible, during weaving, to perform weaving on the bias at the connections between firstly the first segment of the pattern and secondly each of the second and third segments of the same pattern.

Naturally, the CMC nozzle element with inner and outer platform sectors that are not mutually parallel may be made with some number of vanes that is other than two.

The invention claimed is:

1. A one-piece turbine nozzle element made of composite material including fiber reinforcement densified by a matrix that is at least partially ceramic, the nozzle element comprising:

an inner annular platform sector;
an outer annular platform sector; and
a vane extending between the platform sectors and connected to both of the inner and outer platform sectors, the platform sectors extending on either side of connection zones with the vane,
wherein the fiber reinforcement comprises a single-piece fiber structure that is woven by three-dimensional or multi-layer weaving and that presents continuity throughout the volume of the nozzle element and over an entire periphery of the vane, the fiber structure including in a longitudinal direction a pattern including a first segment corresponding to the vane, a second segment extending the first segment at a first longitudinal end thereof, and a third segment extending the first segment at a second longitudinal end thereof, and
wherein at least one of the second segment or the third segment includes two facing flaps situated on either side of a separation zone and pivot on either side of the first segment so as to overlap each other and form a portion of one of the inner platform sector or the outer platform sector.

2. The nozzle element according to claim 1, wherein the vane presents an internal longitudinal passage extending over the entire length of the vane and opening out in the platform sectors.

3. The nozzle element according to claim 1, wherein the vane is solid.

4. The nozzle element according to claim 1, including at least two vanes extending between the platform sectors, and wherein the fiber structure includes yarns that allow a continuous path extending successively along a portion of a first platform sector, along a first vane, along a portion of the other or second platform sector, along a second vane, and then along a portion of the first platform sector.

5. A turbine nozzle comprising a plurality of juxtaposed nozzle elements as claimed in claim 1.

6. A gas turbine having a turbine nozzle according to claim 5.

7. A method of fabricating a single-piece turbine nozzle element made of composite material including fiber reinforcement densified by a matrix that is at least partially ceramic, the nozzle element including an inner annular platform sector, an outer annular platform sector, and a vane extending between the platform sectors and connected to both of the inner and outer platform sectors, the method comprising:

making a woven single-piece fiber blank by three-dimensional or multi-layer weaving, the blank including in a longitudinal direction at least one pattern including a first segment forming a vane preform blank, a second segment extending the first segment at one longitudinal end thereof and forming two flaps situated facing each other, and a third segment extending the first segment at a second end thereof and forming two flaps situated facing each other;
unfolding the blank with relative pivoting between the flaps of the second segment and the first segment on either side thereof at the first end of the first segment so as to cause the flaps of the second segment to overlap each other and extend substantially perpendicularly to the first segment, and with relative pivoting between the flaps of the third segment and the first segment on either side thereof at the second end of the first segment so as to cause the flaps of the third segment to overlap each other and extend substantially perpendicular to the first segment;

shaping the unfolded blank to obtain a fiber preform of the nozzle element with at least a vane preform-forming portion obtained by shaping the first segment, and platform sector preform-forming portions obtained from the flaps; and densifying the preform with a matrix that is at least partially ceramic, whereby, after densification, a single-piece turbine nozzle element is obtained with fiber reinforcement comprising the fiber preform that presents continuity throughout the volume of the nozzle element and over the entire periphery of the vane, wherein the flaps of the second segment form a portion of one of the inner platform sector or the outer platform sector and the flaps of the third segment form a portion of the other of the inner platform sector or the outer platform sector.

8. The method according to claim 7, wherein the blank is made with a second segment and a third segment of widths that are greater than the width of the first segment and extending laterally beyond the lateral edges of the first segment.

9. The method according to claim 8, wherein in at least one of the second and third segments, each of the two flaps is formed with tabs that, in the non-unfolded state, extend the portions of the flaps that project laterally beyond the longitudinal edges of the first segment, extending along the edges while being separate therefrom, and the tabs of a flap are caused to overlap mutually with the tabs of the other flaps when the blank is unfolded.

10. The method according to claim 9, wherein the mutually overlapping tabs are bonded together.

11. The method according to claim 7, wherein the fiber blank is made as a single piece with repetition of the pattern, the third segment of a first pattern and the second segment of a consecutive second pattern extending each other and being in continuity with each other, and while unfolding the blank, the first segment of the first pattern is caused to pivot in one direction relative to the third segment of the first pattern and the first segment of the second pattern is caused to pivot in the opposite direction relative to the second segment of the second pattern to cause the first segments of the first and second patterns to be substantially parallel to each other.

12. The method according to claim 11, wherein while unfolding the blank, a flap of the second segment of the first pattern and a flap of the third segment of a consecutive pattern are caused to extend each other to be capable of forming a portion of a platform sector preform.

13. The method according to claim 12, wherein after the blank has been unfolded, the flaps that have been caused to extend each other are bonded together.

14. The method according to claim 7, wherein while performing multi-layer weaving of the blank, non-interlinked zones are formed between two layers to form the separations between the two flaps of a second segment and between the two flaps of a third segment.

15. The method according to claim 7, wherein, during multi-layer weaving of the blank, a non-interlinked zone is formed between two layers all along the first segment, the non-interlinked zone extending over a portion only of the width of the first segment, at a distance from its longitudinal edges, so that after shaping it forms a vane fiber-preform with an internal passage that extends over the entire length of the preform.

16. A turbine nozzle comprising a plurality of juxtaposed nozzle elements obtained by the method of claim 7.

17. A gas turbine having a turbine nozzle according to claim 16.

* * * * *